United States Patent [19]

Richard et al.

[11] Patent Number: 5,079,766
[45] Date of Patent: Jan. 7, 1992

[54] ACCESS UNIT TO A LOCAL NETWORK TRANSMISSION MEDIUM

[75] Inventors: Claude Richard, Malakoff; Bernard Malgogne, Dreux, both of France

[73] Assignee: Bull, S.A., Paris, France

[21] Appl. No.: 432,547

[22] Filed: Nov. 7, 1989

[30] Foreign Application Priority Data

Nov. 8, 1988 [FR] France .................. 88 14543

[51] Int. Cl.$^5$ .......................................... H04J 3/02
[52] U.S. Cl. .................................................. 370/85.3
[58] Field of Search ............... 370/85.3, 85.2, 94.1; 340/825.51, 825.5

[56] References Cited

U.S. PATENT DOCUMENTS

| | | | |
|---|---|---|---|
| 4,380,088 | 4/1983 | Lipcon | 370/85.3 |
| 4,543,574 | 9/1985 | Takagi et al. | 370/85.2 |
| 4,710,918 | 12/1987 | Miyao | 370/85.3 |
| 4,751,701 | 6/1988 | Roos et al. | 370/85.3 |
| 4,860,006 | 8/1984 | Barall | 370/85.3 |
| 4,910,507 | 3/1990 | Shimizu et al. | 370/94.1 |
| 4,945,532 | 7/1990 | Hald | 370/85.3 |

FOREIGN PATENT DOCUMENTS

0164244 11/1985 European Pat. Off.

OTHER PUBLICATIONS

Fr-A-2 570 563, p. 6, lines 18-21.
Electronic Design, vol. 33, No. 8, 1985, pp. 189-194, 196, 198, 200 by S. Cooper et al.

*Primary Examiner*—Douglas W. Olms
*Assistant Examiner*—Dang Ton
*Attorney, Agent, or Firm*—Wolf, Greenfield & Sacks

[57] ABSTRACT

An access unit to a transmission medium formed of two telephone pairs of a local area network with carrier sense multiple access with collision detection, connected to a station containing a send current generator, a receive signal generator and a collision detector receiving the signals sent by the station and every signal sent by other stations. The unit includes a collision simulation circuit receiving a first send voltage $U_E$ and the receive singal $V_R$, which sends to the collision detector either a second send voltage $V_E$ if the connected station is the only one sending, or the receive signal if the latter is not sending, or a collision simulation signal of which the average value is such that the collision detector signals a collision to the connected station.

15 Claims, 5 Drawing Sheets

ACCESS UNIT TO A LOCAL NETWORK TRANSMISSION MEDIUM

BACKGROUND OF THE INVENTION

The present invention relates in general to an access unit to a local network transmission medium having carrier sense, multiple access with collision detection (CSMA/CD). The present invention relates, more particularly, to local networks of the ETHERNET type in which the transmission medium is comprised, for the transmission as well as reception of signals, of a pair of telephone wires.

In a general way, a data transmission network is comprised of a number of units, including units generally referred to as "data terminal equipment", also referred to as DTE's, or even terminals or stations for the sake of brevity of terminology. These DTE's communicate between each other via a transmission system. The transmission system, for example, can be a bus architecture and may be comprised of two pairs of telephone wires (one for sending, the other for receiving) or a coaxial cable.

Local networks (also referred to as local area networks, LAN's) are transmission networks generally limited to an area of somewhat limited circumference (real estate, plant, campus, hospital) where the distances between stations is from several meters or tens of meters to several kilometers. The transmission of data is done at rates on the order of 100 kbits/sec. to several tens of Mbits/second.

Because the stations of a local network with bus architecture share a single transmission system (usually referred to as a transmission line), it is important that a single station be sending at any one time on the same line. To resolve this problem, the stations or terminals are generally equipped with decision elements that do not authorize the sending of messages unless the station is free. To do this, according to one preferred method, each terminal monitors continuously the signals present on the line and if a message is present on it, no other message is authorized to be sent except by one of the stations other than the sending station. Thus the access methods designed for local bus networks aim to limit access conflicts due to the simultaneous sending by several stations. This access method is referred to as carrier sense, multiple access (CSMA) with collision detection.

However, in spite of these precautions, it can happen that a station does not detect the presence of a message on the transmission line at the moment when it is initiating the sending of a message itself, although another station is in the process of sending. In this type of network, this situation called "collision" is impossible to prevent totally, notably because of the delay in propagation of signals on the line.

In other words, for a specified station, a collision is defined as the simultaneous presence of its own send signal and a signal sent by another station (which, in itself, is a receive signal at the specified station).

To remedy this difficulty, generally a device called a collision detector is used which interrupts the sending of a message in progress when this situation has been detected. The detection of a collision causes the cancellation of the transmission when a new send attempt is made, the send not taking place unless the transmission line is free again. This access method is known as carrier sense, multiple access with collision detection (CSMA/CD).

The local networks of the CSMA/CD type have been standardized by the IEEE (Institute of Electrical and Electronic Engineers) in the form of a standard referred to as 802.3, (summarized by the International Standards Organization (I.S.O.) in the form of standard I.S.O. 8 802.3), of which the essential provisions are the following:

- a DTE when it is a sender of data is either silent, or in the process of sending data,
- a DTE, when it is silent, may, in the role of receiver, either detect a silence, or receive the data coming from one or several other DTE's. If the data received arrive simultaneously from several DTE's, the value of this data is without significance, which is the case when a collision is present.
- a DTE that is in the process of sending, may, in the role of receiver, either detect that its sending is proceeding normally (without collision with the data sent by one or several other DTE's), or that a collision is taking place.

Likewise, the standard defines the format of the frames. A frame has a given structure: it comprises a start of frame delimiter, an end of frame delimiter, synchronizing signals for obtaining a clock signal, the address of the station to which the message is directed, the address of the sending station, the length of the data, the useful data, etc. In other words, the frame is the elementary block of information sent by any station whatsoever, which goes over the transmission line.

In addition, standard 802.3 defines the protocol governing the dialog between the stations. This defines the rules of access to different stations and thus constitutes a system which schedules the communication between stations without prioritizing it.

In current actual practice, there exist two local networks of the CSMA/CD type, namely the local network of the ETHERNET type (ETHERNET is a trademark registered Feb. 6, 1981 by XEROX CORPORATION) and the local network of the STARLAN type, the rate of data transmission for the former being 10 Mbits/second while the rate for the second is 1 Mbit/second.

The physical configuration of a local network of the ETHERNET type is as follows:

the standardized transmission medium is a coaxial cable with a characteristic impedance of 50 ohms equipped at each end with a 50 ohm termination. Each terminal is connected to the coaxial cable by the medium access unit, commonly referred to as a transceiver.

The basic network or elementary segment is composed of a segment of cable along the length of which are distributed access unit connections.

In a very general manner, a local area network is formed by an assembly of several basic networks among which repeaters are placed. These repeaters re-send on a cable the signals that they receive, completely regenerating their initial quality. The functioning of a network of several segments is assured if the network is composed of a principal segment and secondary segments, each secondary segment being connected to the principal segment either by a repeater or by a pair of repeaters connected to each other.

The physical configuration of a local network of the STARLAN type is as follows:

The standardized transmission medium is composed of two telephone wires, one for sending, the other for receiving.

The basic network is comprised of an assembly of terminals, each connected by a pair of telephone wires to a common central hub. This central hub plays the same role as the repeaters in the local network of the ETHERNET type, i.e. re-sends on each of the pairs of telephone wires the signals arriving from any one of the stations, and completely regenerates their initial quality. Several basic networks each containing a central hub may be connected among themselves by other central hubs and thus constitute the properly-called local network. Detection of collisions is done on the level of each central hub.

One of the consequences of current technological progress is that the pairs of telephone wires may in the future transport information with rates on the order of 10 Mbits/second, and indeed more, although this has not been the case for several years. It follows that one of the current tendencies in the development of local area networks of the ETHERNET type consists of using two pairs of telephone lines in place of a coaxial cable, at least for the base networks, as the transmission means. In fact, the telephone pair is much less expensive, for one thing, and for another, its pre-wiring on the property is simpler and less expensive than the pre-wiring of a coaxial cable. For this reason, central hubs that play the same role as those used in the STARLAN network are used, at least for the base networks.

Attempts have been made to use two pairs of telephone wires as the transmission medium in ETHERNET local area networks, the majority of the constituent elements of an ETHERNET local area network using a coaxial cable as the transmission medium.

This is notably the case for the integrated circuit constituting the transceiver used in the ETHERNET local area network with coaxial cable. This type of transceiver is manufactured, for example, by "National Semiconductor" Company (NS) under the commercial designation DP 8392.

The essential component parameters of such a transceiver are the following:
- a sending current generator which receives the signals sent by the station connected to the transceiver and which delivers a send signal in the form of a polarized current (with a non-zero average value),
- a generator of receive signals receiving the signals transmitted by the medium arriving from another station than the connected station in the form of a polarized signal (with a non zero average value),
- a circuit to analyze the signal received by the connected station, receiving on the one hand the signal sent by it and on the other hand any signal sent by another station, this analysis circuit sending a signal to the connected station indicating if it alone is sending or if there is a collision. The signal sent by the station, which is received by the above mentioned analysis circuit, proceeds from the coaxial cable, and, in fact, any current sent by a station creates a voltage in the terminator fitting which is seen by all the stations via their transceiver. This analysis circuit is in fact a circuit to detect collisions. In practice, it is composed of a threshold circuit permitting determination of whether the average value of the voltage of the signal present on the coaxial cable is greater than a specified value equal to the standard average value of the voltage of the send signal.

If the coaxial cable is replaced, in the role of transmission medium, by a pair of telephone wires of which one is physically independent of the other, the following problem appears:
- the transmission medium does not pass on to the transceiver connected to the sending station the send signal of the latter, the station then ignores whether its own send signal received by the transceiver has been sent by same to the other stations via the transmission medium.
- when the station is sending, its own send signal is not being sent back to it by the transmission medium because of the independence of the two pairs of telephone wires one to the other, and it is impossible for the transceiver to detect every collision. This may result in the possibility for each of the stations of the same elementary segment of the network to send at the same time as the others, since each of them is incapable of detecting a collision.

A first solution includes equipping the central hubs with collision detectors as is the case in the local area networks of the STARLAN type. This is not the solution that was used for the central hubs of the ETHERNET networks with twisted pair.

SUMMARY OF THE INVENTION

The object of the invention is then, in a local network of the ETHERNET type, of which the transmission medium is composed of two pairs of telephone wires, to implement a transceiver, of which a part of the constituent elements are those of the transceiver used in the ETHERNET network with coaxial cable. Thus, the transceiver according to the invention has to:
- permit each station that is sending to know at every moment that its send signal received by the transceiver has been properly sent by same on the transmission medium,
- permit each station that is sending to know if there is a collision on the network and as a consequence, according to the CSMA/CD procedure, to interrupt its send and to repeat it several seconds later, according to the standardized procedure IEEE 802.3.

According to the invention, the access unit has a transmission medium (transceiver) of a local area network of the type with carrier sense, multiple access with collision detection (CSMA/CD), which contains at least a number of stations connected among themselves in a star around a central hub, each station being connected to an access unit, the unit containing:
- a send current generator receiving the signals sent by the connected station and delivering a send signal in the form of a polarized current with a non-zero average value,
- a receive signal generator receiving the signals arriving from another station sent by the medium in the form of a polarized voltage with a non-zero average value.
- a collision detector receiving on the one hand the signal sent by the station and on the other hand every signal sent by another station and sending to the connected station a signal indicating if it is the only one sending or if there is a collision, when it receives a signal with an average voltage exceeding, in absolute value, a predetermined value, characterized by the fact that the transmission medium is composed of two pairs of telephone wires, one for sending and the other for receiving, it contains a collision simulation circuit simulating the physical superposition of send and receive signals receiving on the one hand a first send voltage obtained from the send current and on the other hand the receive signal sent by another station via the pair of receive telephone wires and re transmitting on the collision detection circuit either the receive signal present on the transmission medium when the connected station is not sending, or even a collision simulation signal obtained from the send voltage and whose non-zero average value is such that the collision detector signals a collision to the connected station when there is the simultaneous presence of a send signal by the associated station and a receive signal.

According to one particular feature of the invention, the collision simulation circuit includes:
- a circuit detecting every send from the connected station, receiving the first send voltage, sending a first signal of validation indicating that the connected station is sending,
- a detector circuit for receive signals, receiving the reception signal transmitted by the receiving telephone pair and sending a second validation signal indicating the presence of a reception signal on the reception pair,
- an adaptation circuit for the send voltage receiving on the one hand the first send voltage and on the other hand the second signal validation and supplying either the second send voltage when the connected station is the only one sending, or the collision simulation signal,
- a multiplexer receiving the first and the second validation signal, the receive signal, and the second send voltage or the collision simulation signal, and transmitting either the receive signal when the connected station is not sending at the moment, or the second send voltage when the connected station is the only one sending or the collision simulation signal when there is a collision

BRIEF DESCRIPTION OF THE DRAWINGS

Other characteristics and advantages of the present invention will appear in the following description given by way of a non-limiting example and referring to the attached drawings.

In these drawings.

DESCRIPTION OF PREFERRED EMBODIMENTS

Figure 2:
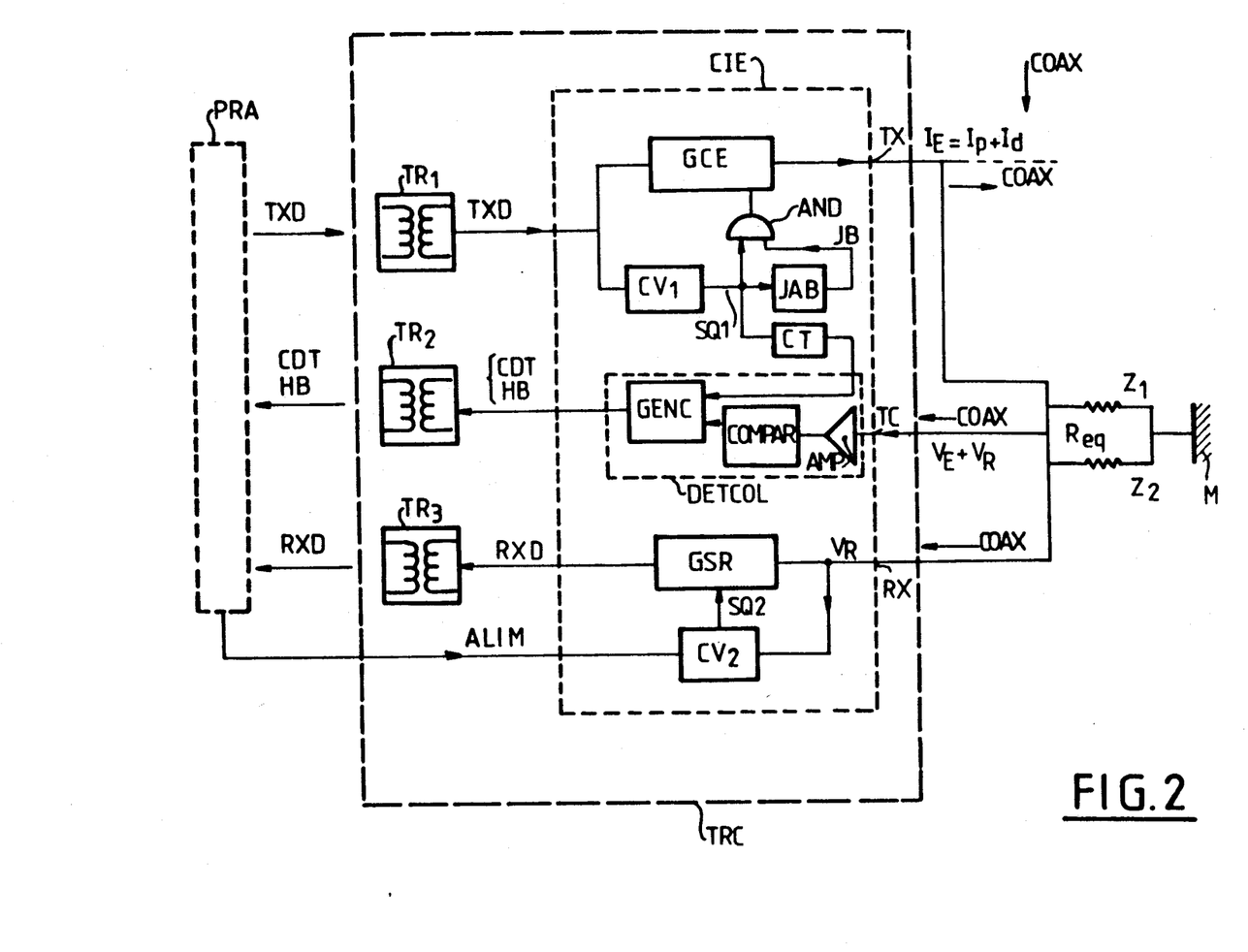
FIG. 2 is a simplified functional schematic of a transceiver for a ETHERNET local area network in which the transmission medium is coaxial, according to the previous type.
Figure 3:
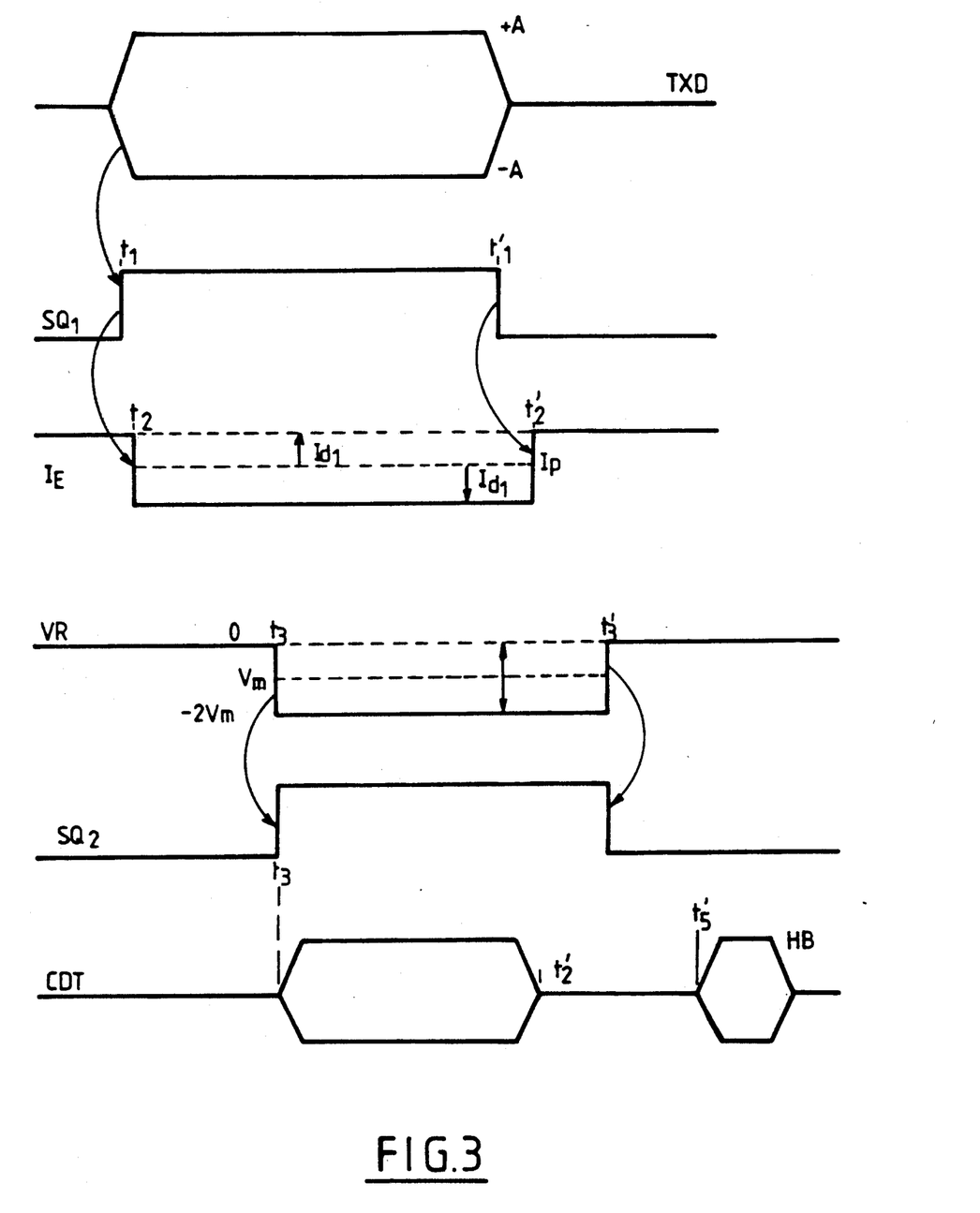
FIG. 3 illustrates timing diagrams of different signals sent and received by the transceiver of FIG. 2.

In order to better understand how the transceiver according to the invention is constituted and how it operates, several summaries are made on the local area networks of the ETHERNET type using two pairs of telephone wires. The transceiver as well as their mode of functioning, are illustrated in FIGS. 1, 2, 3.

Figure 1:
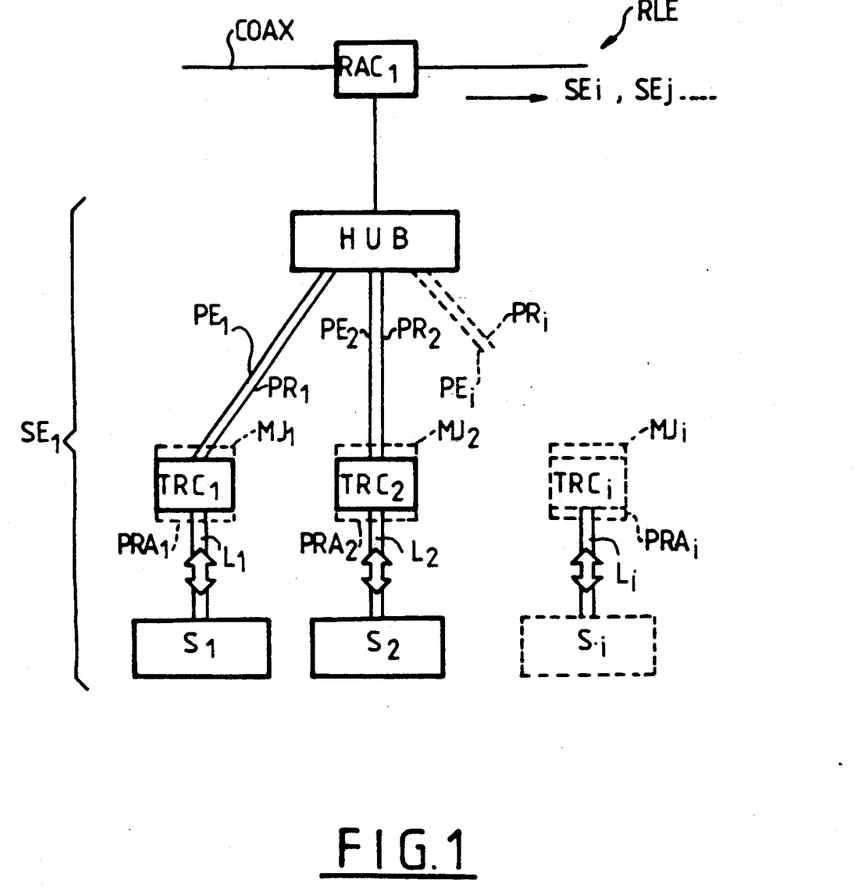
FIG. 1 shows, in the form of a simplified schematic, how an elementary segment of a local area network of the ETHERNET type is made up, using two pairs of telephone wires as the transmission medium.

FIG. 1 represents an elementary segment $SE_1$ belonging to a local area network of the ETHERNET type known as RLE. This segment $SE_1$ includes a number of stations $S_1, S_2, \ldots, S_i, \ldots$, etc, to which are connected transceiver $TRC_1, TRC_2, \ldots, TRC_i, \ldots$, etc. Each station is linked to transceivers connected via a transmission line. Thus stations $S_1, S_2, \ldots, S_i$. etc, are connected to transceivers $TRC_1, TRC_2, TRC_i, \ldots$, etc. by transmission lines $L_1, L_2, \ldots, L_i$, etc. These transmission lines contain, for example, a pair of wires for sending, and a pair of wires for receiving, a pair of wires for collision detection, a pair of wires to feed the transceiver with a constant voltage. Each of the transceivers $TRC_1$ to $TRC_i$ is connected to the corresponding transmission line $L_1$ to $L_i$ via connector terminals $PRA_1$ to $PRA_i$, also called "15-point terminals" conforming to standards defined in IEEE 802.3.

Transceivers $TRC_1, TRC_2, \ldots, TRC_i, \ldots$, etc, are connected to a central HUB via two pairs of telephone wires, one for sending, the other for receiving. Thus the transceiver $TRC_1$ is connected to the central hub via the send pair $PE_1$ and the receive pair $PR_1$. In the same way, transceiver $TRC_2$ is connected to the central hub by two pairs $PE_2$ and $PR_2$, just as transceiver $TRC_i$ is connected to the central hub by the two pairs $PE_i$ and $PR_i$. It is sufficient to specify that one pair of send telephone wires, such as $PE_1$, is physically independent of the receive pair of telephone wires $PR_1$. This signifies that the signals that are sent on one of the pairs are ignored by the other. For each transceiver, the two pairs of telephone wires are connected to it via standardized jacks as referred to in "Modular Jack" ISO 8877. These jacks are designated by $MJ_1, MJ_2, \ldots, MJ_i$, in FIG. 1.

The role of the central hub is essentially to recover the signals arriving from the different stations, to reshape them, and to amplify them to send them to the other stations.

The elementary segment $SE_1$ of the local area network RLE described above is connected, for example, to other elementary segments $SE_i, SE_j, \ldots$, etc, via the central hub which is connected to a transmission medium such as a COAX cable via a connection means RAC as illustrated in FIG. 1.

FIG. 2 illustrates a transceiver TRC according to the previous type of FIG. 1 used in an Ethernet network with a coaxial transmission medium, the transceiver being associated to the connected station in the same manner as transceivers $TRC_1$ to $TRC_i$ are connected to their stations $S_1$ to $S_i$.

A transceiver TRC like this contains:
a set of transformers $TR_1, TR_2, TR_3$,
an integrated circuit CIE.

Transformers $TR_1$ to $TR_3$ are connected between 15 point terminal PRA analogous to terminals $PRA_1$ to $PRA_i$ in FIG. 1 and the integrated circuit CIE.

The circuit CIE includes three output connectors TX, TC, RX (the two connectors TC and RX being connected to each other) connected to coaxial line COAX which is represented in FIG. 2, for simplification, in the form of its equivalent electrical diagram, namely an assembly of two characteristic impedances $Z_1$, $Z_2$ (essentially ohmic) placed in parallel. The equivalent resistance to these two characteristic impedances $Z_1$, $Z_2$ is designated as $R_{eq}$. One of the terminals common to the two characteristic impedances $Z_1$, $Z_2$ is connected to ground M, while the other common terminal is connected, respectively, to three output connectors TX, TC, RX of the integrated circuit CIE.

The purpose of using transformers $TR_1$ to $TR_3$ is to provide galvanic isolation, i.e. on the one hand the protection of the person against the station-media assembly and on the other hand the protection of the integrated circuit CIE from any overvoltage which could occur on the transmission line L, principally because of the presence in the supply wire of continuous voltage ALIM, this continuous voltage feeding each of the circuits which constitute the integrated circuit CIE.

The integrated circuit CIE contains:
a send current generator GCE,
a validation circuit $CV_1$,
a gate AND,
a timing circuit JAB,
a trigger circuit CT of a signal indicating the proper functioning of the collision detection of the transceiver TRC connected to the station,
a collision generator GENC,
a threshold detector COMPAR,
an amplifier AMP,
a receive signal generator GSR,
and a second validation circuit $CV_2$.

It is assumed that the sending station S sends a send signal TXD of which the voltage (see FIG. 3) varies between a positive amplitude A and a negative amplitude - A. This signal is assumed to be sent between instants $t_1$ and $t'_1$. This signal TXD is simultaneously transmitted by transformer $TR_1$ to the send current generator GCE and to the first validation circuit $CV_1$. The latter, in response to signal TXD, sends a logic validation signal $SQ_1$ equal to logic 1 between instants $t_1$ and $t'_1$. It is transmitted to one of the inputs of the gate AND. In addition, this same signal $SQ_1$ is sent to the timing circuit JAB, which in response to the latter sends a signal equal to logic 1 during a fully specified time, equal to 20 milliseconds. This signal JB is coupled to the second input of the gate AND. When the output signal of the gate AND is equal to loqic 1 (i.e. if the send length of the signal TXD, and as a result the validation signal $SQ_1$ is less than 20 milliseconds), the send current generator GCE sends on the output terminal TX a send current $I_E$, between instants $t_2$ and $t'_2$. This send current $I_E$ has a non-zero average value $I_p$. The send current $I_E$ is equal to the sum of a polarization current with intensity $I_p$ and a data send current $I_d$ in a rectangular form as illustrated in FIG. 3. Thus:

$I_E = I_p + I_d$ where $I_d$ is in practice current, for example, equal to ±45 milliamps and $I_p$ is equal to -45 milliamps. In fact, the intensity of current $I_E$ varies according to the value of the data bits of the send frame, either to 0 or to -90 milliamps and its average value is -45 milliamps.

The validation signal $SQ_1$ is also sent to the trigger circuit CT. The latter, at the instant $t'_5$ after the instant $t'_1$ where the validation signal $SQ_1$ drops to logical 0, with $t'_5 - t'_1 = \Delta t$ (where $\Delta t$ is in practice current equal to 1 microsecond), triggers the operation of generator GENC which then sends a signal HB in the form of a square wave signal with a frequency equal to 10 megahertz and a duration equal to 1 microsecond. This signal is sent to transformer $TR_2$ which re-transmits it via the terminal PRA and by the line L to the station S. This signal indicates to station S that its send signal was properly received by the transceiver and that the collision generator is operating correctly.

At the terminal RX of integrated circuit CIE, the receive signal $V_R$ sent by every station other than station S arriving from the coaxial cable COAX is gathered. This signal has the form of a voltage with an average non-zero value of $V_m$ (see FIG. 3). This voltage has the form of a rectangular signal which corresponds to the bits equal to 0 or 1 of a receive signal sent by a station other than the station S in the form of a data frame (see above). It is assumed that the receive signal $V_R$ is received between instants $t_3$ and $t'_3$. It is likewise sent to the validation circuit $CV_2$ which delivers the signal $SQ_2$ equal to logic 1 between instants $t_3$ and $t'_3$. Signal $SQ_2$ from the validation circuit $CV_2$ is sent to the receive signal generator GSR which does not transmit the signal RXD equal to $V_R$, to transformer $TR_3$ except when the signal $SQ_2$ is present, i.e. equal to logic 1. The validation circuit $CV_2$, and as a result the validation signal $SQ_2$ is needed so as to prevent the generator GSR from transmitting parasitic signals to transformer $TR_3$ and consequently to the connected station S. In fact, if there is no send signal and if there are only interference signals on the coaxial line, the signal $SQ_2$ remains equal to logic 0 and thus generator GSR does not transmit interference signals to transformer $TR_3$.

When a send signal arriving from station S and a receive signal $V_R$ arriving from another station (for example $S_i$) are simultaneously present on the coaxial cable COAX, a voltage is provided on the terminal TC of the integrated circuit CIE:

$$V_C = V_E + V_R \qquad (1)$$

where:

$$V_E = R_{eq} \times I_E = R_{eq} \times (I_p + I_{d1}) \qquad (2)$$

with $I_E = I_p + I_{d1}$ and:

$$V_R = R_{eq} \times I_R = R_{eq} \times (I_p + I_{d2}) \qquad (3)$$

with $I_R = I_p + I_{d2}$

There is then, at a minimum:
$V_C = R_{eq} \times 2I_p$

Voltage $V_C$ is sent to amplifier AMP which sends it to a threshold detector COMPAR.

If the threshold voltage of detector COMPAR is regulated to a value $V_S$ such that:

$V_S = G \times R_{eq} \times I_p$, where G is the coefficient of amplification of amplifier AMP, it can be seen that there is a collision, signal $V_C$ amplified with the gain G will, at the minimum, be equal to:

$2G \times R_{eq} \times I_p$, value greater than the threshold voltage.

In this case, the threshold detector COMPAR sends a signal, for example equal to logic 1, to the collision generator GENC which then sends at the instant $t_3$ when there is a collision, a square signal CDT of frequency 10 megahertz sent to transformer $TR_2$ which sends it to station S and does so until instant $t'_2$ when the collision stops. The station S, when it receives this signal, interprets it as a collision and then sends the interference data during a certain time, according to the standardized procedure defined by standard IEEE 802.3, before waiting a certain time for re-sending a message.

It must be noted that in the absence of any signal $V_R$ sent by a station other than station S, the terminal RX of transceiver TRC receives the voltage $V_E$ corresponding to its own send current (provided that it is connected to terminal TC). Station S then verifies, using to signal RXD then sent by generator GSR, that the transceiver TRC has properly sent on the coaxial line a send signal corresponding to the send signal TXD of the station and also that the transceiver is operating correctly.

It can be said that the assembly composed of amplifier AMP, threshold detector COMPAR and the collision generator GENC constitutes a collision detector DETCOL.

More complete details on the structure and the function of the integrated circuit CIE will be found in the technical note from the manufacturer National Semiconductor relative to integrated circuit DP.8392.

Figure 4:
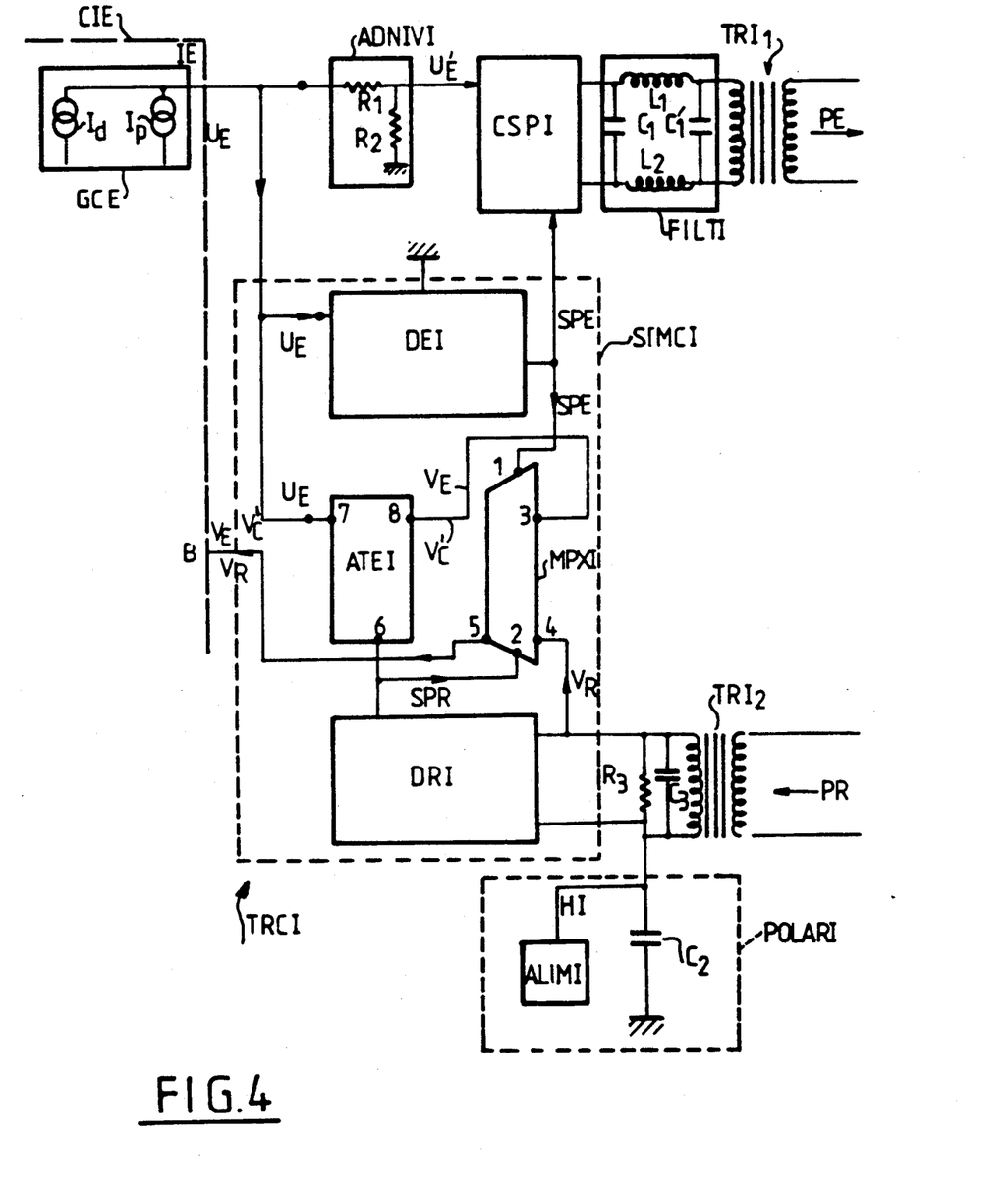
FIG. 4 shows a transceiver connected to a station of a local area network of the ETHERNET type using two pairs of telephone wires as the transmission medium, according to the invention.

Refer now to FIG. 4 which shows the transceiver according to the invention, also known as transceiver TRCI, connected to station S.

This transceiver includes the integrated circuit CIE analogous to that shown in FIG. 2 and a collision simulation circuit SIMCI, simulating the physical superposition of the send and receive signals of the station.

The collision simulation circuit SIMCI which can also be called a collision simulator, receives a primary send voltage $U_E$ obtained from current $I_E$ sent by the send current generator GCE of integrated circuit CIE. In addition, it receives voltage $V_R$ of the receive signal, arriving from a second station $S_j$ of the network.

This collision simulator SIMCI fulfills three essential functions:

1. When station S is the only one sending, the collision simulator sends a second send voltage $V_E$ corresponding to the send current $I_E$ on the terminals RX and TC of the integrated circuit CIE. This voltage $V_E$ has an average value $V_{Ea}$ less in absolute value than the average value $U_{Ea}$ of the primary voltage $U_E$, and such that, after amplification by the amplifier AMP, it remains less than $V_S$, i.e. that $|G \times V_{Ea}| < |V_S|$. In fact, if the input voltage of the amplifier corresponding to $V_S$, i.e. $V_S/G$ is on the order of $-1.5$ volts, $V_{Ea}$ is chosen on the order of $-1$ volt. Thus, the collision simulation circuit SIMCI implements the re-looping of the send signal from the station to itself via the integrated circuit CIE, a role which was taken by the coaxial line COAX in the local network according to the previous type in FIG. 2.

2. When station S is not sending and there is a receive signal present on the receive pair PR, the voltage $V_R$ of the receive signal is transmitted by the collision simulation circuit SIMCI to the integrated circuit CIE on its terminals TC and RX.

3. If station S is sending at the same time as any other station on the network, there is the simultaneous presence of the primary send voltage $U_E$ and of the receive voltage $V_R$ on the input terminals of the collision simulation circuit SIMCI. The simulation circuit then sends on the terminal TC (and likewise on the terminal RX) a signal $V'_C$ which has a form analogous to the second voltage $V_E$, but of which the average value is higher (in absolute value). Thus the simulation circuit gives the impression to the integrated circuit CIE (to the collision detector DETCOL of the latter) that it receives a signal resulting from the superposition of a send signal and a receive signal, even though it does not realize the physical superposition of these two signals In the latter case, in fact, the receive signal $V_R$ is ignored and not transmitted to the integrated circuit CIE, but this detects in any case a collision via circuit DETCOL, since the average value of the voltage $V'_C$ after amplification by amplifier AMP is greater (in absolute value) than the threshold voltage $V_S$. It can even be said that the circuit SIMCI simulates the physical superposition of the send and receive signals. In the example of the preferred embodiment described here, we have $V'_C = U_E$. $V'_C$ is thus a collision simulation signal.

FIG. 4 likewise shows the essential constituent elements of the collision simulation circuit SIMCI. These different elements are:

a detection circuit DEI of the send signal, a detection circuit DRI of the receive signal, an adaptation circuit ATEI of the send signal voltage, a multiplexer MPXI, the send and receive detection circuits also known as DEI and DRI, are practically identical in their makeup. They are formed by classic threshold detection devices, made up, for example, of two elements manufactured by the MOTOROLA company, under reference 10116. Such detectors are also described in the Blue Book of ETHERNET (ETHERNET version of local network produced by XEROX, INTEL and DEC companies).

The circuit DEI receives the first send voltage $U_E$ and delivers a signal of the presence of the send signal SPE which is sent on terminal 1 of multiplexer MPXI.

The first voltage $U_E$ is obtained from sending current $I_E$ and coupled to a level adapter ADNIVI (see FIG. 4) composed of two resistors $R_1$ and $R_2$.

One of the terminals of resistor $R_1$ is connected to the output of generator GCE, the terminal common to resistors $R_1$ and $R_2$ is connected to the send pair PE via circuits CSPI, FILTI and via the transformer $TRI_1$, as will be described later. The second terminal of resistor $R_2$ is connected to ground.

In the example described here where resistors $R_1$ and $R_2$ are chosen equal to 27 and 33 ohms respectively, the average value $U_{Ea} = (R_1 + R_2)I_{Ea}$, where the average value $I_{Ea}$ of $I_E$ is on the order of $-45$ mA, is therefore $-2.7$ volts.

In the same way, when a receive signal $V_R$ is present, the receive signal detector DRI delivers a signal SPR sent, respectively, on terminal 2 of multiplexer MPXI and on terminal 6 of the send voltage adapter circuit ATEI.

The send voltage adapter circuit ATEI receives on its terminal 7 the first send voltage $U_E$. It delivers on its terminal 8 a signal that is either equal to the second send voltage $V_E$ when the station S connected to transceiver TRCI is the only one sending, or the signal $V'_C$ when the station S is sending simultaneously with any station of the network. The signals $V_E$ or $V'_C$ are sent to terminal 3 of multiplexer MPXI.

The multiplexer likewise receives on its terminal 4 the receive signal $V_R$ and sends via its terminal 5 the same signal to terminals RX and TC of the integrated circuit CIE. This signal $V_R$ is not transmitted unless there is no send signal by the station S.

The detailed operation of the circuit SIMCI is as follows:

First case:

There is a send of a message by the station and as a result, production by the generator GCE of a send current $I_E$, as long as no other station in the network is in the process of sending. In that case, the emission detection circuit DEI delivers the signal SPE to multiplexer MPXI which, in addition, receives on its terminal 3 the second voltage $V_E$ arriving from the adapter circuit ATEI. The multiplexer MPXI then transmits via its terminal 5 the second voltage $V_E$ to terminals RX and TC of the integrated circuit CIE.

Second case:

Station S does not send unless a receive signal is present sent by another station on the receive pair PR. The signal $V_R$ is sent to terminal 4 of multiplexer MPXI of which terminal 2 receives the signal SPR. Under these conditions, multiplexer MPXI then transmits, from its terminal 5, the receive signal $V_R$ to terminals RX and TC of the integrated circuit CIE.

Third case:

Station S sends a message at the same time as another station of the network. A receive signal is then present on the receive pair PR. Signals SPE and SPR, indicating the presence of a send and the presence of a receive, are sent to terminals 1 and 2 of multiplexer MPXI which receives on its terminal 3 the signal $V'_C$ arriving from the send voltage adapter circuit ATEI at the same time as it receives on its terminal 4 the signal $V_R$, the adapter circuit ATEI receiving also at its terminal 6 the signal SPR. Multiplexer MPXI does not transmit the signal $V_R$ to terminals RX and TC. In contrast, it is the signal $V'_C$ that is transmitted by the multiplexer, from its terminal 5, to terminals RX and TC, thus permitting a collision detection by the detector circuit DETCOL. Consider now FIG. 5 which represents a particular mode of implementation of the collision simulation circuit SIMCI and more particularly the voltage adapter circuit ATEI and the multiplexer MPXI.

Figure 5:
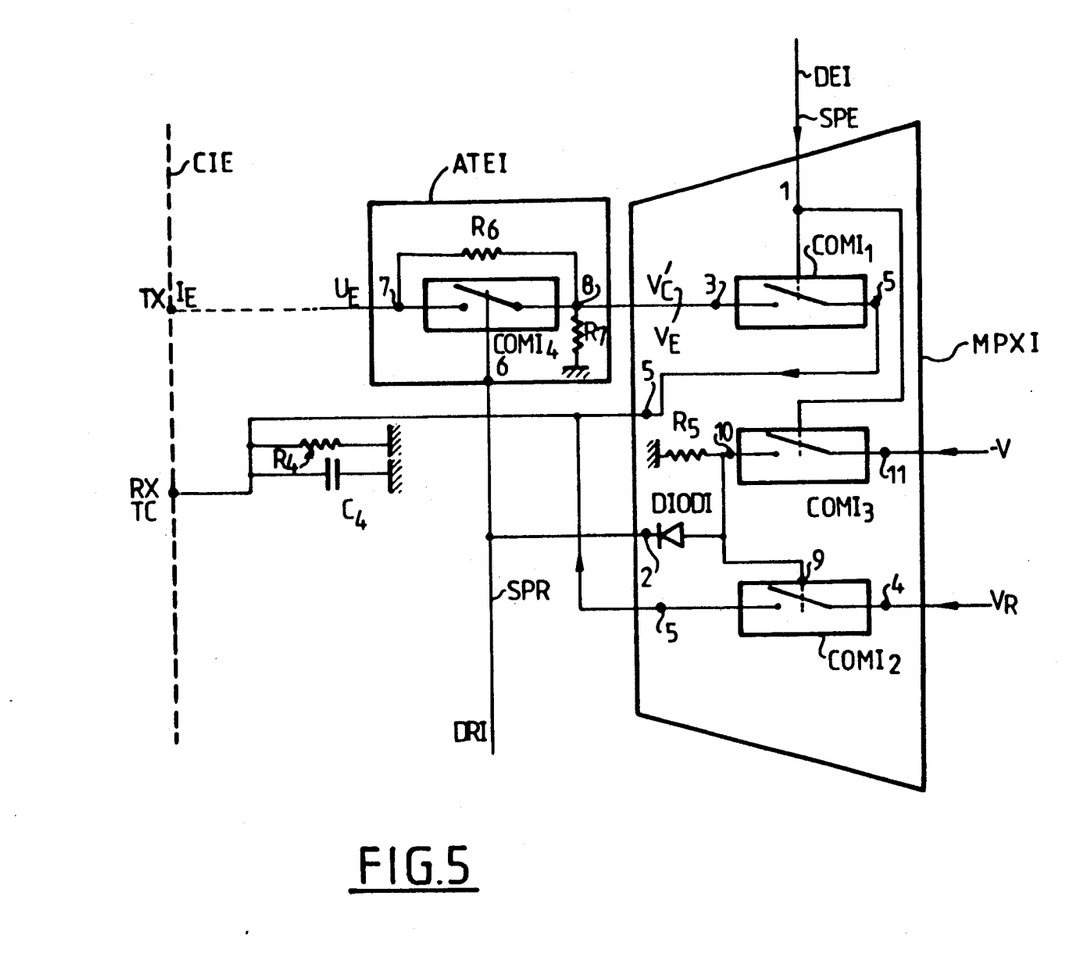
FIG. 5 is a particular mode of implementation of the collision stimulation circuit of the transceiver according to the invention.

The send voltage adapter circuit ATEI is formed by a divider bridge of resistors $R_6$ and $R_7$ and an analog switch COMI$_4$ mounted in parallel to the resistor $R_6$. The terminal common to resistor $R_6$ and to switch COMI$_4$ constitutes the input 7 of circuit ATEI and the terminal common to resistors $R_6$, $R_7$ and switch COMI$_4$ constitutes the output 8 connected to input 3 of multiplexer MPXI. The opening and closing command terminal of switch COMI$_4$ constitutes the input terminal 6 of circuit ETEI.

Multiplexer MPXI contains the three analog switches COMI$_1$, COMI$_2$, COMI$_3$, diode DIODI and resistor $R_5$.

Switches COMI$_1$ to COMI$_4$ are identical analog switches and are for example 74 HC 40664V switches manufactured by SGS-THOMSON or R.C.A.

One of the terminals of switch COMI$_1$ constitutes the input 3 of the multiplexer while its other terminal constitutes the output 5. Its opening and closing command terminal is connected to input 1 of the multiplexer the same as that of switch COMI$_3$.

The closing or the opening of switch COMI$_1$ is thus commanded by the signal SPE sent to the input 1.

Output 5 of the multiplexer is connected to terminals RX and TC of the integrated circuit CIE. These two latter are de coupled by the circuit formed by resistor $R_4$ and capacitor $C_4$.

One of the terminals of switch COMI$_2$ constitutes input 4 and thus receives the receive signal $V_R$. Its second terminal is connected to the output 5 of the multiplexer. Its opening and closing command terminal 9 is connected on one end to the anode of diode DIODI of which the cathode is connected to the output 2 of the multiplexer and thus receives the signal SPR. The anode of the diode DIODI is also connected to terminal 10 of switch COMI$_3$ and to one of the terminals of the load resistor $R_5$ of switch COMI$_3$ of which the other terminal is connected to ground. The other terminal 11 of switch COMI$_3$ is connected to a negative voltage $-V$, equal, in the preferred embodiment example, to $-9V$.

In an example of a preferred embodiment of the invention, the signals SPE or SPR are equal to 0 volts if a send signal $U_E$ or a receive signal $V_R$ is present and they are equal to $-9V$ in the opposite case.

In addition, switches COMI$_1$ to COMI$_4$ are closed if their opening and closing command terminals are subjected to a zero voltage and open if they are subjected to a negative voltage of $-9V$.

The function of the voltage adapter circuit ATEI and of multiplexer MPXI is explained in detail below. There are four modes of operation, which are as follows:

First case:

Station S is the only station in the network to send. No receive signal then exists on the receive pair. Switch COMI$_4$, receiving on its opening or closing command terminal 6 a signal SPR of which the voltage is equal to $-9V$, remains open. On the other hand, the two switches COMI$_1$ and COMI$_3$ which receive on their command terminals 1 the signal SPE, of which the voltage is zero, are closed. The closing of switch COMI$_3$ keeps open switch COMI$_2$ which permits integrated circuit CIE to receive none of the possible parasitic signals present on the receive line. The adapter circuit then sends via switch COMI$_1$, which is closed, the voltage $V_E$ on terminals RX and TC of the circuit CIE. Since switch COMI$_4$ is open, the voltage $V_E$, accepted on the terminals of resistor $R_7$ is such that $V_E = (R_7/(R_6+R_7)) \times U_E$. In the example of the embodiment described here where $R_6 = 820 \, \Omega$ and $R_7 = 510 \, \Omega$, one then has:

$$V_{Ea} = -2.7 \times (510/1330) = -1 V.$$

Second case:

Station S is not sending and another station in the network is sending. There is then present a receive signal $V_R$ on terminal 4 of switch COMI$_2$. The signal SPR is activated. This signal has zero voltage. This results in the closing of switch COMI$_4$. Switches COMI$_1$ and COMI$_3$ are open, the terminal 9 is practically at zero potential, which closes switch COMI$_2$. In this way, the receive signal $V_R$ is transmitted to terminals RX and TC of circuit CIE.

Third case:

There is a simultaneous send by station S and another station of the network. Switch COMI$_4$ is closed, as well as switches COMI$_1$ and COMI$_3$. The closing of these latter two keeps open switch COMI$_2$. As switch COMI$_4$ is closed, the resistor $R_6$ is short-circuited. Thus the primary voltage $U_E$ is returned to the terminals of resistor $R_7$. The circuit ATEI delivers signal $V'_C$ identical to voltage $U_E$ which is sent across switch COMI$_1$ on terminals RX and TC, which permits the detection of the collision (see above). It can be seen that, as well as detecting the collision by means of circuit DETCOL, the average value of the voltage of the signal delivered by the circuit ATEI is modified.

Thus, according to the invention, a collision can be detected without it being physically realized by superposition of the send signal and the receive signal at any place on the network.

Fourth case:

No station is sending on the network. Switches COMI4, COMI1, COMI3 and COMI2 are open and diode DIODI is conducting. Terminal RX is loaded by resistor R4 - capacitor C4 in comparison to ground and there is no signal on this terminal.

We refer again to FIG. 4 which shows other details of the transceiver according to the invention other than the simulation circuit SIMCI.

In order to prevent overvoltages from being transmitted via the transceiver on the pairs of send and receive telephone wires, the transceiver is equipped with transformers TRI1 and TRI2 of which the outputs are connected, respectively, to the send pair PE and the receive pair PR.

Given that the send current $I_E$ is polarized and that it must energize transformer TRI1 with voltage, current $I_E$ is sent to level adapter ADNIVI which sends a polarized voltage $U_E$ of which the average value $V_P$ is not zero:

$$V_p = U_{Ea} \times R_2/(R_1 + R_2) = -2.7 \times 33/60 = -1.5 V$$

If it is desirable to prevent the transformer from having its primary saturated by this voltage $U'_E$ and as a consequence cause signal alterations, it is necessary that the latter be energized by a voltage of which the average value is zero. A continuous counterpolarizing voltage with a value equal to $-V_p$ is then added to voltage $U'_E$ via a polarization suppression circuit CSPI. This polarization suppression circuit CSPI is in fact a differential amplifier of which one branch is connected to a threshold voltage equivalent to that of the average value $V_p$. This differential stage then plays the role of an adder of a voltage equal and opposite to the average value $-V_p$ of the output signal $U'_E$. The circuit CSPI is implemented by means of a circuit ECL 10192 of National Semiconductor Company.

The circuit CSPI is commanded by the signal SPE which does not validate its operation unless there is a send by the station.

Between the polarization suppression circuit CSPI and the primary of the transformer TRI1 a filter FILTI is placed which is meant to block signals with frequency that is too high, that is to say, the harmonics of the fundamental of the send signal which are found in its sides. In fact, circuit CSPI (ECL 10192) switches the ascending and descending front of the different bits constituting the send signal in an extremely harsh manner, which creates elevated frequency harmonics. It is thus necessary to suppress them before the output of circuit CSPI.

Just as can be seen from FIG. 4, this circuit FILTI is, for example, comprised of two inductances $L_1$ and $L_2$ placed in series with the primary of the transformer and by two capacitors $C_1$ and $C'_1$ placed in parallel.

Given that the receive signal generator GSR of circuit CIE waits for a signal $V_R$ having a non-zero average value, and that the receive signal sent by any station whatsoever of the network on the pair of receive telephone wires PR has a zero average value, it is necessary to add to the receive signal a polarization voltage. This is done by a polarization circuit POLARI which then adds a polarization signal to the receive signal SR present on the receive pair PR. This polarization circuit POLARI is simply comprised of a supply circuit ALIMI delivering a voltage HI, equal, for example, in the example shown in FIG. 4, to $-0.8$ volts. A decoupling capacitor $C_2$ is placed on the supply terminals of the circuit ALIMI. In parallel to the secondary of the transformer, a high frequency filtering circuit is placed formed by the resistor $R_3$ and the capacitor $C_3$. This filtering permits sending a signal $V_R$ of which the different bits are perfectly usable by the circuit GSR of the integrated circuit CIE.

Having now described a preferred embodiment of the present invention, it should now be apparent to those skilled in the art that numerous other embodiments, modifications thereof are contemplated as falling within the scope of the present invention as defined by the appended claims.

What is claimed is:

1. An access unit for connecting a station to a transmission medium of a local area network a plurality of stations with carrier sense, multiple access with collision detection (CSMA/CD), said transmission medium comprising first and second twisted pairs of wires, said first pair for sending information from a connected station to other stations in the network, and said second pair for receiving information into said connected station from other stations in the network, said access unit comprising:

send current generator means for receiving signals sent by said connected station and having means for delivering a send signal with a non-zero average value to said transmission medium, first means for receiving a signal from at least one other station via said transmission medium, collision producing means having second means for receiving said send signal delivered by said send current generating means and third means for receiving a receive signal from said first means for receiving a signal, said send signal indicating whether said connected station is sending, and said receive signal indicating whether another station is sending, said collision producing means responsive to said send and receive signals to provide an output signal having an average voltage indicative of the average value of the superposition of said send and receive signals, collision detector means having means for receiving said send signal, means for receiving said output signal provided by said collision producing means, and means responsive to said output signal for producing a collision signal and including means for sending said collision signal to said connected station, said collision signal indicating a collision when the average voltage of said output signal exceeds, in absolute value, a predetermined value.

2. An access unit according to claim 1 wherein said collision producing means comprises:

a detector circuit for receiving said send signal and for sending a first validation signal indicating that the connected station is sending, a receive signal circuit for receiving said receive signal, and for sending a second validation signal indicating the presence of a receive signal on said first means for receiving, a receive voltage adapter circuit having first input means for receiving said send signal and second input means for receiving said second validation signal and output means for providing an output signal having an average value indicative of the average value of the superposition of said send signal and said receive signal.

a multiplexer for receiving and responsive to the first and second validation signals, the receive signal and said output signal of said receive voltage adapter circuit to provide said signal of said collision producing circuit.

3. An access unit according to claim 2 wherein said detector circuit and said receive signal circuit comprise threshold detector circuits.

4. An access according to claim 3 wherein the receiving voltage adapter circuit comprises:
 a first resistor having first and second terminals, said first terminal connected to said first input means,
 a second resistor having first and second terminals, said second terminal connected to ground,
 an analog switch connected in parallel with said first resistor and responsive to said second validation signal to open and close said switch, and having an output terminal, and
 said second terminal of the first resistor, said first terminal of said second resistor and said output terminal of the analog switch commonly connected to said output means.

5. An access unit according to claim 4 wherein the multiplexer comprises first, second and third analog switches, a diode and a resistor,
 said first switch having a first terminal for receiving the output of the receive voltage adapter circuit, and a second terminal,
 said first and third switches each having a command terminal receiving the first validation signal,
 the second switch having a first terminal for receiving the receive signal and a second terminal connected to the second terminal of said first switch, and a command terminal connected to the anode of the diode,
 said third switch having a first terminal connected to a negative voltage, and a second terminal connected to the command terminal of said second switch, and
 the cathode of the diode receiving the output of the receive signal detector circuit,
 said resistor having a first terminal connected to said anode and a second terminal connected to ground.

6. An access unit according to claim 4 wherein the send current generator means has means connected to said first pair of twisted wires said connected means comprising:
 a level adapter which transforms the send current to a voltage with a non-zero average value,
 a polarization suppression circuit which receives a fraction of said send voltage and outputs a signal corresponding to the sum of said fraction and a voltage equal and opposed to the average value of said fraction,
 a transformer having a primary for receiving the output of the polarization suppression circuit and a secondary connected to the first pair of twisted wires.

7. An access unit according to claim 6, wherein said collision producing means has means connected to said second pair of twisted wires of the transmission medium, said connected means comprising a transformer, having a primary connected to said second pair of wires and having a secondary connected to said collision producing means via a high frequency filtering circuit,
 said filtering circuit comprising a polarization circuit having means connected the secondary of said transformer and having means connected to ground, said polarization circuit sending on the secondary a continuous polarization voltage such that the receive signal has a no-zero average value.

8. A network comprising at least one access unit according to claims 1 to 7.

9. A collision producing circuit for an access unit connecting a station to a transmission medium of a local area network of a plurality of stations with carrier sense, multiple access with collision detection (CSMA/CD), the network containing at least one collision detector having means for sending a signal indicating a collision when it receives a signal of which the average voltage exceeds, in absolute value, a predetermined value, wherein the transmission medium is composed of two pairs of wires, one for sending and the other for receiving, said collision producing circuit comprising:
 first means for receiving a first voltage from a first station,
 second means for receiving a second voltage from a second station, and
 means for sending to the collision detector an output signal having an average value indicative of the average value of the superposition of said first and second voltages.

10. A collision producing circuit for an access unit connecting a station to a transmission medium of a local area network of a plurality of stations, the network containing at least one collision detector, said transmission medium comprising a first means for sending information from a connected station to other stations in the network, and a second means for receiving information into the connected station from other stations in the network, said collision producing circuit comprising:
 first input means for receiving a send signal indicating whether said connected station is sending,
 second input means for receiving a receive signal indicating whether another station is sending, and
 output means responsive to both said means for receiving for providing to said collision detector an output signal having an average value indicative of the average value of the superposition of said send and receive signals.

11. A collision producing circuit as set forth in claim 9 wherein:
 said first means for receiving includes means for sending a first validation signal indicating whether the connected station is sending,
 said second means for receiving includes means for sending a second validation signal indicating whether another station is sending, and
 said means for sending an output signal includes a receive voltage adapter circuit and a multiplexer,
 said receive voltage adapter circuit has first input means connected to said first receiving means for receiving the first voltage, second input means connected to the second receiving means for receiving the second validation signal, and output means for providing a third voltage equal to the first voltage when another station is sending an less than the first voltage when no other station is sending, and
 said multiplexer has means for receiving and responsive to said first and second validation signals, and said voltage and said third voltage to provide said output signal.

12. A collision producing circuit as set forth in claim 11, wherein:
  said output signal provided by the multiplexer is indicative of said second voltage when said first validation signal indicates that the connected station is not sending; and
  said output signal provided by the multiplexer is indicative of the superposition of said third voltage and said second voltage when said first validation signal indicates said connected station is sending.

13. A collision producing circuit as set forth in claim 12, wherein said receive voltage adapter circuit comprises:
  a first resistor having first and second terminals, said first terminal connected to said first input means,
  a second resistor having first and second terminals, said second terminal connected to ground,
  an analog switch connected in parallel with said first resistor and responsive to said second validation signal to open and close said switch, and having an output terminal; and
  said second terminal of the first resistor, said first terminal of said second resistor, and said output terminal of the analog switch commonly connected to said output means.

14. A collision producing circuit as set forth in claim 13, wherein said multiplexer comprises first, second and third analog switches, a diode and a resistor,
  said first switch having a first terminal for receiving the third voltage signal from the receive voltage adapter circuit, and a second terminal,
  said first and third switches each having a command terminal receiving the first validation signal,
  the second switch having a first terminal for receiving the receive signal and a second terminal connected to the second terminal of the first switch, and a command terminal connected to the anode of the diode,
  said third switch having a first terminal connected to a negative voltage, and a second terminal connected to the command terminal of said second switch,
  the cathode of the diode receiving the second validation signal; and
  said resistor having a first terminal connected to the anode of the diode and a second terminal connected to ground.

15. A collision producing circuit as set forth in claim 9, wherein said means for sending an output signal includes means operative when both the connected station and another station are sending for superimposing the first and second voltages to provide said output signal, means operative when only the connected station is sending for attenuating said first voltage and superimposing the attenuated first voltage with the second voltage to provide said output signal, and means operative when the connected station is not sending for providing as the output signal a voltage indicative of the second voltage.

* * * * *